No. 692,329. Patented Feb. 4, 1902.
J. D. McLINDEN.
HOT WATER HEATER.
(Application filed Apr. 25, 1901.)
(No Model.)

WITNESSES:
M. M. Durkin
L. Duane.

INVENTOR
John D. McLinden,
BY
J. R. Littell
his ATTORNEY.

UNITED STATES PATENT OFFICE.

JOHN D. McLINDEN, OF NEW YORK, N. Y.

HOT-WATER HEATER.

SPECIFICATION forming part of Letters Patent No. 692,329, dated February 4, 1902.

Application filed April 25, 1901. Serial No. 57,424. (No model.)

*To all whom it may concern:*

Be it known that I, JOHN DAVID MCLINDEN, a citizen of the United States, residing at New York, in the county and State of New York, have invented certain new and useful Improvements in Hot-Water Heaters, of which the following is a specification.

This invention relates to hot-water heaters; and it has for its object to provide an improved device of this class whereby a given quantity of water may be more quickly and effectively heated and a material saving of fuel may be effected in the operation.

The particular object of the invention is to provide a heater of this class which will be especially adapted for use in hotels, restaurants, and similar establishments and which may be easily kept in order and will require a minimum of attention.

Figure 1:
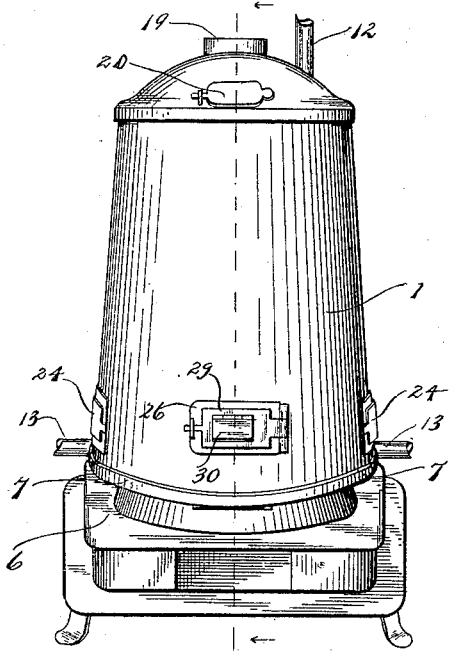
Figure 2:
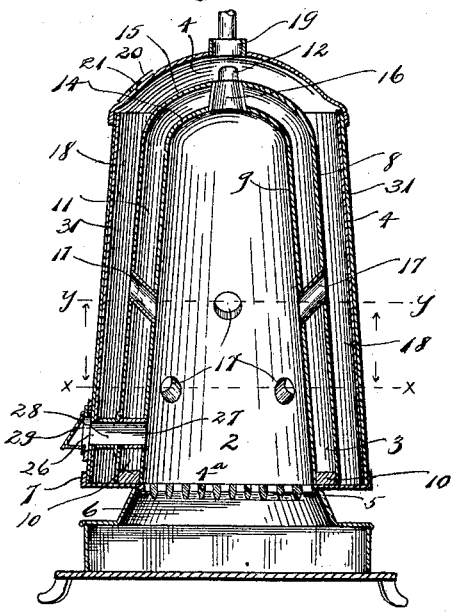
Figure 3:
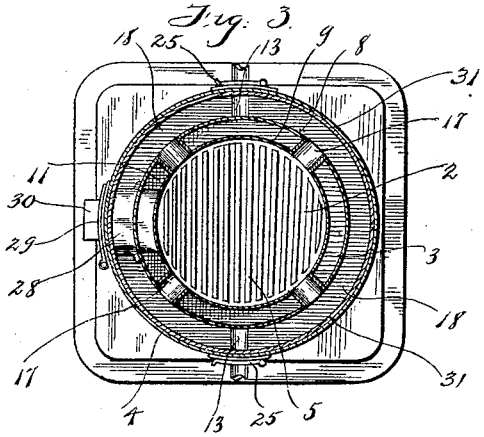
Figure 4:
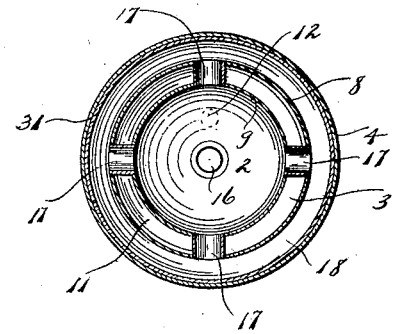

In the drawings, Figure 1 is a perspective view of my improved hot-water heater. Fig. 2 is a vertical sectional view of the same. Fig. 3 is a detail transverse sectional view of the same, taken upon the line $x$ $x$, Fig. 2. Fig. 4 is a detail transverse sectional view of the same, taken upon the line $y$ $y$, Fig. 2.

Corresponding parts in all the figures are denoted by the same reference characters.

Referring to the drawings, 1 designates my improved heater, which consists in the main of a heater proper, 2, a boiler 3, and an outer boiler-casing 4, within and spaced from which the boiler is arranged.

The heater proper, 2, may consist of a suitable fire-box 4ª and a grate 5, which are both embodied in a suitable base 6. The base 6 is provided with an annular top rim or flange 7, upon which the bases of the boiler and of the outer casing rest and to which they are suitably secured.

In the preferred form of construction the boiler 3 consists of an outer shell 8 and inner shell 9, which shells are annular in form and are connected at their bases by a base-ring 10. The shells 8 and 9 are relatively separated by an inner space 11, which constitutes the working interior of the boiler. The outer shell 8 is provided at its top with a water-outlet 12, which communicates with the inner space 11, and is provided at its base with one or more lateral water-inlets 13. The shells 8 and 9 are closed at their upper ends by dome-shaped top portions 14 and 15, respectively, and a flue-pipe 16 extends between the top portions of the shells and communicates at its upper and lower ends, respectively, with the interior of the inner shell 9 and the interior of the outer casing 4. The flue-pipe 16 preferably tapers in diameter at its upper end for a purpose hereinafter recited. A plurality of upwardly-ranging boiler-tubes 17 extend through the inner space 11 between the inner and outer shells of the boiler and through said shells, whereby the heat and smoke from the heater proper, 2, may pass through the same from the interior of the inner shell into the flue-space 18 between the casing 4 and the outer shell. The column of water in the boiler 3 is thus subjected to heat both interiorly and exteriorly and also through the medium of the tubes 17, which extend directly through the mass of the water. The contracted flue-pipe 16 prevents heat and smoke from the heater proper from directly passing out into the flue-space 18 through the flue-pipe 16 and causes the same in an appreciable volume to pass laterally through the boiler-tubes 17 and thence upwardly through the flue-space 18, as described.

The casing 4 extends around the sides and over the top of the boiler 3 and is provided centrally at its top with a flue connection 19 and at one side of the same with a cleaning-opening 21, which is provided with a door 20 and through which entrance may be had to the flue-space 18 to clean the upper part of the same. The casing 4 is also provided at its base at opposite sides with cleaning-openings 22 and 23, respectively, which are closed by doors 24 and 25, respectively, and through which entrance may be had to the lower portion of the flue-space 18 to clean the same.

The heater proper is supplied with fuel through an opening 26, formed at one side and at the bottom of the casing 4, and through a registering opening 27, formed in the boiler-shells. The openings 26 and 27 are connected by a horizontal casing 28, which extends from the casing 4 to and through both shells of the boiler. The opening 26 is closed by a furnace-door 29, which may be provided with a damper 30.

The inner surface of the casing 4 is provided with a suitable heat insulation 31, whereby loss of heat by radiation through the casing 4 is prevented.

The operation and advantages of my improved hot-water heater will be readily understood by those skilled in the art to which it appertains. Water is admitted to the boiler 3 through the water-supply openings 13 and when heated flows from the boiler through the water-outlet 12. The heat from the heater proper, 2, rises through the interior of the inner shell 9 and passes through the upwardly-ranging boiler-tubes 17, as well as through the flue-pipe 16, and thus passes freely over the inner surface of the inner shell of the boiler and the outer surface of the outer shell of the same. The heat and products of combustion then rise through the flue connection 19, whereby they may be led into open air or a suitable flue, as desired. The contracted formation of the flue-pipe 16 operates to the end of a damper in causing the passage of the heated products of combustion laterally through the boiler-tubes 17 for the purposes specified. The interior of the casing 4—namely, the flue-space 18—may be readily cleared of soot and other collected products of combustion by the introduction of suitable implements through the cleaning-openings 21, 22, and 23. The outer end of the horizontal casing 28, which extends between the stoking-openings 26 and 27 in the boiler-casing and boiler, respectively, may be detachably secured to the boiler-casing as its outer end, as at 28$^a$, whereby the casing 4 and the boiler may be readily disconnected for shipment or storage.

The entire water-heater is relatively simple in construction, of increased efficiency in operation, and generally superior in point of convenience and general operative effectiveness.

I do not desire to be understood as limiting myself to the details of construction and arrangement as herein described and illustrated, as it is manifest that variations and modifications may be made in the features of construction and arrangement, in the adaptation of the device to various conditions of use, without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. The herein-described hot-water heater, comprising a heater proper, a boiler arranged above the same and consisting of two concentric shells separated by a space which constitutes the working interior of the boiler, an outer casing surrounding and spaced from the boiler by a flue-space, a plurality of upwardly-ranging boiler-tubes extending through the boiler and whereby the flue-space communicates with the interior of the inner shell of the boiler, said outer casing being provided at the top with a flue connection, and a contracted flue-pipe extending through the boiler at the top of the same in alinement with the flue connection.

2. The herein-described hot-water heater, comprising a heater proper, a boiler arranged above the same and consisting of two concentric shells separated by a space which constitutes the working interior of the boiler, an outer casing surrounding and spaced from the boiler by a flue-space, a plurality of upwardly-ranging boiler-tubes extending through the boiler and whereby the flue-space communicates with the interior of the inner shell of the boiler, and a contracted flue-pipe extending through the boiler at the top of the casing.

In testimony whereof I have signed my name in the presence of the subscribing witnesses.

JOHN D. McLINDEN.

Witnesses:
GEO. VAIL B. HUPPERTZ,
J. R. LITTELL.